(12) United States Patent
Janik

(10) Patent No.: US 12,539,412 B2
(45) Date of Patent: Feb. 3, 2026

(54) PERISTALTIC PUMP FOR A DEVICE FOR EXTRACORPOREAL BLOOD TREATMENT

(71) Applicant: B. Braun Avitum AG, Melsungen (DE)

(72) Inventor: Waldemar Janik, Melsungen (DE)

(73) Assignee: B. Braun Avitum AG, Melsungen (DE)

( * ) Notice: Subject to any disclaimer, the term of this patent is extended or adjusted under 35 U.S.C. 154(b) by 242 days.

(21) Appl. No.: 18/035,038

(22) PCT Filed: Nov. 3, 2021

(86) PCT No.: PCT/EP2021/080507
§ 371 (c)(1),
(2) Date: May 2, 2023

(87) PCT Pub. No.: WO2022/096502
PCT Pub. Date: May 12, 2022

(65) Prior Publication Data
US 2024/0009445 A1    Jan. 11, 2024

(30) Foreign Application Priority Data
Nov. 6, 2020   (DE) ...................... 10 2020 213 988.1

(51) Int. Cl.
*A61M 60/284* (2021.01)
*A61M 60/109* (2021.01)

(52) U.S. Cl.
CPC ........ *A61M 60/284* (2021.01); *A61M 60/109* (2021.01)

(58) Field of Classification Search
None
See application file for complete search history.

(56) References Cited

U.S. PATENT DOCUMENTS 2,679,807 A    6/1954   Bruckmann
4,363,609 A *  12/1982  Cosentino ........... F04B 43/1276
                                              417/477.7
(Continued)

FOREIGN PATENT DOCUMENTS

CN    107842622 A    3/2018
CN    108661872 A    10/2018
(Continued)

OTHER PUBLICATIONS

Search Report received in International Application No. PCT/EP2021/080507 dated Apr. 19, 2022, with translation, 9 pages.

*Primary Examiner* — Jonathan M Peo
(74) *Attorney, Agent, or Firm* — Christopher A. Rothe; CM Law

(57) ABSTRACT

A peristaltic pump includes a housing and a rotor that rotates about a rotor axis. The rotor has a rotor body and a pump. The housing has a cut-out in which the rotor is accommodated and a support surface extending about the rotor axis. The support surface supports a tube segment that is introducible between the rotor and support surface. The rotor has a first element for manually actuating the rotor and a first portion for applying a manual rotation actuation force. The first element is mounted on the rotor body and is movable relative to the rotor body between a first position, in which the first portion is spaced from the rotor axis by a first length, and a second position, in which the first portion is spaced from the rotor axis by a second length, the second length being greater than the first length.

14 Claims, 4 Drawing Sheets

(56) References Cited

U.S. PATENT DOCUMENTS

| | | | |
|---|---|---|---|
| 4,548,553 A * | 10/1985 | Ferster | F04B 43/1253 |
| | | | 417/477.7 |
| 4,759,386 A | 7/1988 | Grouw, III | |
| 9,562,529 B2 | 2/2017 | Schaefer | |
| 2004/0179964 A1 | 9/2004 | O'Mahony et al. | |
| 2005/0095155 A1 | 5/2005 | Blight et al. | |
| 2020/0147291 A1 * | 5/2020 | Goto | A61M 1/3669 |

FOREIGN PATENT DOCUMENTS

| | | | |
|---|---|---|---|
| CN | 111336302 A | 6/2020 | |
| DE | 102012105913 A1 | 1/2014 | |
| EP | 1457677 B1 | 9/2004 | |

* cited by examiner

PERISTALTIC PUMP FOR A DEVICE FOR EXTRACORPOREAL BLOOD TREATMENT

CROSS-REFERENCE TO RELATED APPLICATION(S)

This application is the United States national stage entry of International Application No. PCT/EP2021/080507, filed Nov. 3, 2021, and published as WO2022/096502 on May 12, 2022, and claims priority to German Application No. 10 2020 213 988.1, filed Nov. 6, 2020 and published as DE102020213988. The contents of International Application No. PCT/EP2021/080507 and German Application No. 10 2020 213 988.1 are incorporated by reference herein in their entireties.

FIELD

The invention relates to a peristaltic pump for a device for extracorporeal blood treatment, having a rotor, which can be rotated about a rotor axis and has a main rotor body, and a pump housing having a receiving recess, in which the rotor is received and which has a support surface that extends arcuately around the rotor axis, is spaced apart radially from the rotor and is configured to support a hose segment that can be introduced radially between the rotor and the support surface, wherein the rotor has at least one first actuation element, which is configured for manual rotary actuation of the rotor about the rotor axis and which has at least one first actuation section for applying a manual rotary actuation force.

BACKGROUND

A peristaltic pump of this kind is known from US 2004/0179964 A1 and is provided for pumping blood through an extracorporeal blood circuit of a dialysis machine. The known peristaltic pump has a pump housing with an arcuately extending support surface and a rotor which can be rotated inside the support surface about a rotor axis and has a main rotor body. A hose segment can be introduced between the support surface and the rotor. To pump the blood, the hose segment is compressed locally by the action of the rotating rotor. In this case, the rotor is driven by a motor. In addition, the rotor has an actuation element in the form of a rotary knob, which is mounted fixedly on the main rotor body. For manual emergency operation of the peristaltic pump, the rotor can be rotated about the rotor axis by means of a manual rotary actuation of the rotary knob.

DE 10 2012 105 913 A1 discloses a further peristaltic pump. For manual emergency operation, a crank handle mounted pivotably on the main rotor body is provided. The crank handle can be moved between an idle position and an actuation position. In the idle position, the crank handle is accommodated in a manually inaccessible manner in a recess of the main rotor body, making manual rotary actuation impossible.

SUMMARY

It is an object of the invention to provide a peristaltic pump of the type mentioned at the outset which ensures reliable emergency operation and at the same time has a structure which is as simple as possible.

This object is achieved by virtue of the fact that the first actuation element is mounted at least indirectly on the main rotor body and at least some section or sections thereof can be moved relative to the main rotor body between a first actuation position, in which the first actuation section is spaced apart from the rotor axis by a first lever arm length, and a second actuation position, in which the first actuation section is spaced apart from the rotor axis by a second lever arm length, wherein the second lever arm length is greater than the first lever arm length. By means of the solution according to the invention, the first actuation element can be moved in a manner adapted to the situation between different actuation positions, namely the first and the second actuation position. The invention is based on the insight that, depending on the situation, a comparatively greater or smaller manual drive torque may be necessary and/or desirable for rotating the rotor. By virtue of the mobility of at least some section or sections of the first actuation element, the lever arm length of the first actuation section which is effective about the rotor axis can be changed in a simple manner. This allows simple adjustment of the resulting manual drive torque while maintaining the same manual rotary actuation force. If, for example, a person operating the peristaltic pump should ascertain that the rotor cannot be rotated manually in the first actuation position or can be rotated only with difficulty, movement into the second actuation position can be performed. As a result of the comparatively greater second lever arm length which is then effective, the rotor can accordingly be rotated more easily manually. Ultimately, this enables particularly reliable emergency operation of the peristaltic pump. In order to move the first actuation section between the first and the second actuation position, at least some section or sections of the first actuation element is/are movable relative to the main rotor body. For example, it may only be the first actuation section which is movable relative to the main rotor body, while further sections of the first actuation element are mounted on the main rotor body in such a way as to be immovable relative to the main rotor body. Alternatively, the entire first actuation element can be mounted on the main rotor body in such a way as to be movable relative to the latter. The first actuation section and/or the first actuation element are preferably linearly movable between the first and the second actuation position. For this purpose, the rotor preferably has a linear guide. Alternatively, the first actuation element can be of telescopic configuration. As a further alternative, a pivotable movement of the first actuation element can be provided by means of a pivoting guide or the like. The first actuation element can be mounted directly or indirectly on the main rotor body. In the first actuation position, the first actuation section is arranged radially on the inside in relation to the rotor axis. In the second actuation position, the first actuation section is arranged radially on the outside in relation to the rotor axis. The first and the second actuation position preferably each form an end position along the movement path, and therefore it is also possible to refer to a first end position and a second end position. Said end positions or, alternatively, locations are to be distinguished from any intermediate positions of the first actuation section and/or first actuation element. In such intermediate positions, there is no structurally defined, at least unilaterally limited and/or stable relative position with respect to the main rotor body. In other words, in the first actuation position, the first actuation section and/or the first actuation element preferably occupy/occupies an at least unilaterally limited and/or stable relative position with respect to the main rotor body which is structurally defined along the movement path. Said at least unilateral limitation can, in particular, be brought about by positive and/or nonpositive engagement, by means of a stop, a detent or the like. This preferably also applies, mutatis mutandis, for the second actuation position. The peristaltic pump can also be referred to as a hose roller pump. The rotor axis can be understood to mean a physical axle or shaft element or an imaginary axis in the geometric sense. The rotor can also be referred to as a runner. The support surface can also be referred to as a running surface. The hose segment is not part of the peristaltic pump.

In one embodiment of the invention, the first actuation element is guided in a linearly movable manner between the first actuation position and the second actuation position. Such linearly movable guidance is structurally particularly simple and can be implemented in a space-saving manner. The actuation element is preferably guided in a linearly movable manner along a guidance direction which is oriented transversely, particularly preferably perpendicularly, to the rotor axis. For linearly movable guidance of the first actuation element, the rotor preferably has a linear guide which extends longitudinally along a guide axis. This can be formed between the main rotor body and the first actuation element and/or between the first actuation element and an element fixedly connected to the main rotor body. In this embodiment of the invention, the first actuation position can also be referred to as a radially retracted or withdrawn actuation position. In corresponding fashion, the second actuation position can also be referred to as a radially extended or deployed actuation position.

In a further embodiment of the invention, the first actuation element is arranged on an upper side of the main rotor body and can be moved between the first actuation position and the second actuation position in a guidance plane extending parallel to a plane of rotation of the rotor. On the one hand, this ensures ergonomic manual accessibility of the first actuation element and/or of the first actuation section both in the first and in the second actuation position. In addition, a particularly space-saving arrangement is achieved in this way. The plane of rotation of the rotor is perpendicular to the rotor axis. The first actuation element is preferably linearly movable within the guidance plane. As a further preference, the first actuation element is movable along a guide axis extending within the guidance plane.

In a further embodiment of the invention, the rotor has a second actuation element with a second actuation section, wherein the first actuation section and the second actuation section are arranged radially opposite at a distance from the rotor axis. The second actuation element is configured for manual rotary actuation of the rotor about the rotor axis. The second actuation section is configured for the application of a further manual rotary actuation force, which can act in addition to the manual rotary actuation force that can be applied to the first actuation section. The second actuation section is spaced apart from the rotor axis by a lever arm length in a radially opposite manner to the first actuation section. The second actuation element is mounted at least indirectly on the main rotor body and can be movable or stationary relative to the latter. This embodiment of the invention offers ergonomic benefits, in particular. The first actuation element and the second actuation element are preferably arranged on the main rotor body, preferably on its upper side, forming an actuation arrangement, wherein the actuation arrangement can be grasped between the fingers and the thumb of one hand for rotary actuation.

In a further embodiment of the invention, the first actuation element and the second actuation element are arranged symmetrically with respect to one another. A mirror-symmetrical and/or point-symmetrical arrangement is preferably provided. The symmetrical arrangement is preferably aligned with respect to a radially extending plane of symmetry of the rotor and/or of the main rotor body. The symmetrical, preferably mirror-symmetrical, arrangement of the two actuation elements preferably applies only in one of the two actuation positions of the first actuation element. In particular, this embodiment of the invention enables further improved ergonomics.

In a further embodiment of the invention, the second actuation element is arranged and/or formed on the main rotor body in such a way as to be stationary relative thereto. The second actuation element is preferably arranged and/or formed on the upper side of the main rotor body. In comparison with an alternative embodiment in which both the first and the second actuation element are mounted on the main rotor body so as to be movable relative thereto, this embodiment of the invention offers a simplified construction. The second actuation element can be formed integrally on the base body or can be joined to the main rotor body by means of a joined connection.

In a further embodiment of the invention, a linear guide which is formed in a structurally separate manner from the main rotor body is provided between the first actuation element and the second actuation element, by means of which linear guide the first actuation element is guided between the first actuation position and the second actuation position. The structural separation of the linear guide from the main rotor body offers design advantages, in particular. For example, it is possible to dispense with a structural adaptation of the main rotor body for the purpose of mounting the first actuation element in a movable manner. The linear guide preferably extends longitudinally along a guidance direction and/or axis oriented radially with respect to the rotor axis. As a further preference, the linear guide has a first guide profiling and a second guide profiling, which interact in a slidingly movable manner along the guidance direction and with positive engagement perpendicularly to the guidance direction. The first guide profiling is preferably formed on the first actuation element. The second guide profile is preferably formed on the second actuation element. In one embodiment of the invention, the linear guide is in the form of a dovetail guide. The first actuation element can be moved along the linear guide to a limited extent between the first and second actuation positions. In order to limit the mobility of the first actuation element, stop sections formed on the first and/or second actuation element are preferably provided.

In a further embodiment of the invention, the second actuation element is mounted at least indirectly on the main rotor body and can be moved relative to the main rotor body in a radially opposite manner to the first actuation element between different actuation positions. The second actuation element is preferably guided in a linearly movable manner between the different actuation positions. As a further preference, the second actuation element is arranged together with the first actuation element on an upper side of the main rotor body and can be moved between the different actuation positions in a guidance plane extending parallel to a plane of rotation of the rotor. In a first actuation position of the second actuation element, the second actuation section is arranged radially on the inside in relation to the rotor axis. In a second actuation position of the second actuation element, the second actuation section is arranged radially on the outside in relation to the rotor axis. Accordingly, correspondingly different lever arm lengths act in the different actuation positions of the second actuation element. It is thereby possible to achieve a further increased manual drive torque when necessary, while maintaining the same rotary actuation force. In this embodiment of the invention, the first actuation element and the second actuation element are preferably guided between their different actuation positions by means of a linear guide arranged on the main rotor body.

The invention also relates to a rotor for a peristaltic pump according to the preceding description, having a main rotor body and at least one first actuation element, which is configured for manual rotary actuation of the rotor about a rotor axis and which has at least one first actuation section for applying a manual rotary actuation force. According to the invention, the first actuation element is mounted at least indirectly on the main rotor body and at least some section or sections thereof can be moved relative to the main rotor body between a first actuation position, in which the first actuation section is spaced apart from the rotor axis by a first lever arm length, and a second actuation position, in which the first actuation section is spaced apart from the rotor axis by a second lever arm length. With regard to the advantages associated with the configuration of the rotor according to the invention, reference is made to the description of the peristaltic pump according to the invention. For advantageous embodiments of the rotor according to the invention, reference is made to the description of the embodiments of the peristaltic pump according to the invention and what has been said about the rotor there, in order to avoid repetitions.

The invention also relates to a device for extracorporeal blood treatment having a peristaltic pump according to the preceding description.

BRIEF DESCRIPTION OF THE DRAWING FIGURES

Further advantages and features of the invention will be found in the following description of preferred exemplary embodiments of the invention, which are explained with reference to the drawings.

DETAILED DESCRIPTION

Figure 1:
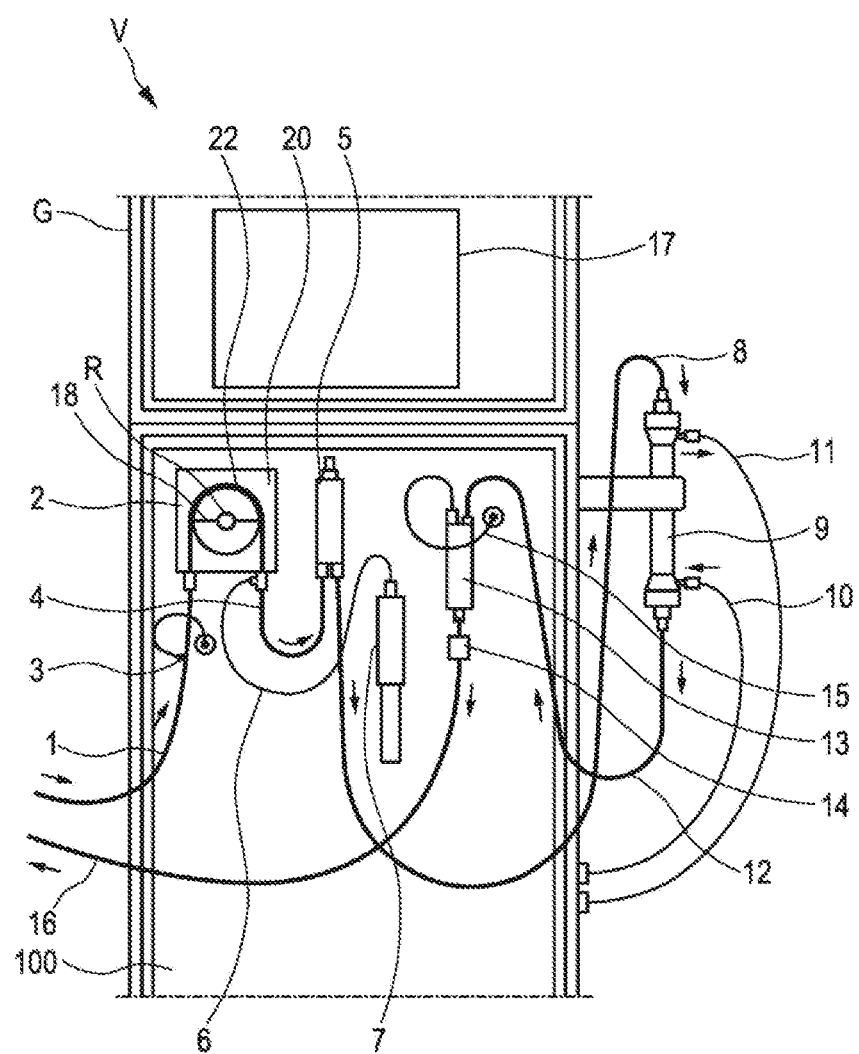
FIG. 1 shows a schematically simplified illustration of a segment of an embodiment of a device according to the invention for extracorporeal blood treatment, which is provided with an embodiment of a peristaltic pump according to the invention.

According to FIG. 1, a segment of a medical device V for extracorporeal blood treatment is shown, said device being in the form of a dialysis machine. FIG. 1 essentially shows an entire extracorporeal blood circuit of the medical device V. The extracorporeal blood circuit has an arterial blood line 1, by means of which blood to be treated is carried from a patient (not shown) to a peristaltic pump 2 of the medical device V. An arterial pressure pick-up 3 is provided upstream of the peristaltic pump 2 with respect to a delivery direction of the blood. By means of the arterial pressure pick-up 3, the pressure in the arterial blood line 1 upstream of the peristaltic pump 2 can be detected. This pressure can also be referred to as a low-pressure-side pressure. Downstream of the peristaltic pump 2 in the delivery direction of the blood—and thus on a high-pressure side—a high-pressure blood line 4 leads to an arterial air trap 5. In the present case, a feed line 6, which is connected to a pump 7, is arranged at an outlet of the peristaltic pump 2. Additive, for example heparin for blood dilution, can be metered in via the feed line 6. From the arterial air trap 5, a line 8 carries the blood to be treated to a dialyzer 9, to which dialyzing fluid is fed on the inlet side via a dialyzing fluid feed line 10. In the dialyzer 9, the blood is treated in a known manner by means of the dialyzing fluid. Used dialyzing fluid, which can also be referred to as dialysate, is discharged from the dialyzer 9 via a dialyzing fluid discharge line 11 and is fed to a disposal or treatment station (not shown). The blood to be treated is carried by means of a blood discharge line 12 from the dialyzer 9 to a venous air trap 13 for the separation of air. This is followed by an air detector/air bubble detector 14, which detects whether there is air in the system, which would be dangerous for the patient. A venous pressure pick-up 15, by means of which the venous pressure can be detected, is provided at the venous air trap 13. From the venous air trap 13, via the air detector/air bubble detector 14, the treated blood is carried back to the patient via a venous blood line 16. In addition, a control and monitoring device 17 for controlling and monitoring the medical device V is provided. The medical device V is encapsulated in a housing G, which has a housing front 100, on which, in particular, the peristaltic pump 2 is mounted.

The peristaltic pump 2 has a rotor 18, which is shown only in greatly simplified form by means of FIG. 1, and a pump housing 20. In a state ready for operation, the pump housing 20 can be covered by means of a cover, not shown specifically in the drawings, which is mounted pivotably on the pump housing 20, e.g. by means of a pivot bearing arrangement, likewise not shown specifically.

The pump housing 20 has a receiving recess 19, in which the rotor 18 is received so as to be rotatable about the rotor axis R. In addition, the pump housing 20 has a support surface 23 that extends arcuately around the rotor axis R and is spaced apart radially from the rotor 18. The support surface 23 is configured to support a hose segment 22 that can be introduced radially between the rotor 18 and the support surface 23 (FIG. 1). In the state ready for operation shown by means of FIG. 1, the hose segment 22 is introduced into the receiving recess 19 and supported on the support surface 23. At its opposite ends, the hose segment 22 is connected in a fluid-conducting manner to the arterial blood line 1 and the high-pressure blood line 4 in a manner known to a person skilled in the art. For pumping the blood, the rotor 18 acts on the hose segment 22 in a manner that is fundamentally known, with the result that a section of the latter is compressed elastically between the rotor 18 and the support surface 23. The pinching of the hose segment 22 that occurs in this case, which can also be referred to as occlusion, moves as it were with the rotating rotor 18 about the rotor axis R, as a result of which the blood is delivered from the low-pressure side to the high-pressure side. To drive the rotor 18 about the rotor axis R, a drive motor, not shown specifically in the drawing, is provided. The drive motor can be assigned to the peristaltic pump 2 and/or to the medical device V and is operatively connected to the rotor 18 in a torque-transmitting manner about the rotor axis R.

Particularly if the drive motor is impaired or if the hose segment 22 is being inserted and/or removed for the purpose of preparing the medical device V ready for operation, manual driving of the rotor 18 may be necessary and/or desirable. For this purpose, the rotor 18 has at least one first actuation element 24, which is configured for manual rotary actuation of the rotor 18 about the rotor axis R. The first actuation element 24 has at least one first actuation section 25, which is provided for the application of a manual rotary actuation force. As is shown particularly by means of FIGS. 2 and 3, the first actuation element 24 is mounted at least indirectly on a main rotor body 26 and at least some section or sections thereof can be moved relative thereto between different actuation positions, namely a first actuation position (FIG. 2) and a second actuation position (FIG. 3). In the first actuation position, the actuation section 25 is spaced apart from the rotor axis R by a first lever arm length H1. In the second actuation position, the first actuation section 25 is spaced apart from the rotor axis R by a second lever arm length H2. Here, the second lever arm length H2 is greater than the first lever arm length H1. As a result, a manual rotary actuation force F acting on the first actuation section 25 produces different manual drive torques M1, M2 acting about the rotor axis R, depending on the actuation position of the first actuation element 24. In this case, the manual drive torque M2 acting in the second actuation position is greater than the manual drive torque M1 acting in the first actuation position in proportion to the ratio of the lever arm lengths H1, H2. In simplified terms, the rotor 18 is easier to rotate manually in the second actuation position than in the first actuation position. There is unrestricted manual access to the first actuation section 25 both in the first and in the second actuation position.

In the embodiment shown, the rotor 18 has a second actuation element 27 with a second actuation section 28. The second actuation section 28 is arranged radially opposite and at a distance from the first actuation section 24.

For the manual rotary actuation of the rotor 18, the first actuation element 24 and the second actuation element 27 are grasped between the thumb and the fingers of one hand and rotated about the rotor axis R by the action of the manual rotary actuation force F and a further rotary actuation force F'. Here, the rotary actuation force F acts on the first actuation section 25. The further rotary actuation force F' acts on the second actuation section 28.

In the present case, both actuation elements 24, 27 are arranged on an upper side 29 of the main rotor body 26. In addition—at least in the first actuation position—the first actuation element 24 and the second actuation element 27 are arranged mirror-symmetrically with respect to a central longitudinal axis (without reference sign) of the main rotor body 26.

In an embodiment not illustrated in the drawing, a point-symmetrical arrangement is provided.

The first actuation element 24 and the second actuation element 27 each have a strip-, bar- and/or cuboid-shaped basic shape. The first actuation element 24 extends longitudinally in the radial direction between a first end 30 and a second end 31. The first actuation section 25 is arranged in the region of the first end 30. The second actuation element 27 extends longitudinally in the radial direction between a first end 32 and a second end 33. The second actuation section 28 is arranged in the region of the first end 32.

In the first actuation position of the first actuation element 24 (FIG. 2), the second actuation section 28 is spaced apart from the rotor axis R by a lever arm length (not illustrated specifically in the Figure) which corresponds in terms of magnitude to the first lever arm length H1. In the first actuation position, the first actuation element 24 and the second actuation element 27 form an actuation arrangement in the form of a rotary knob which projects from the upper side 29 along the rotor axis R, wherein each of the actuation elements 24, 27 forms one half of said arrangement or of said rotary knob. In the first actuation position, the first end 30 of the first actuation element 24 and the second end 33 of the second actuation element are aligned with one another in the radial direction so as to be flush. The same applies to the second end 31 of the first actuation element 24 and the first end 32 of the second actuation element 27.

In the embodiment shown, the first actuation element 24 is guided in a linearly movable manner relative to the main rotor body 26 and/or the second actuation element 27 between the first actuation position (FIG. 2) and the second actuation position (FIG. 3). For this purpose, the rotor 18 has a linear guide L, which will be described in more detail below.

In embodiments that are not illustrated specifically in the drawings, the first actuation element can instead be guided pivotably or rotatably between the first actuation position and the second actuation position. For this purpose, the rotor can have a pivoting and/or rotary guide.

In the embodiment shown, the first actuation element 24 can be moved as a rigid body between the first actuation position and the second actuation position. Accordingly, not only the first actuation section 25 but, instead, the entire first actuation element 24 is moved between the actuation positions. In an embodiment that is not shown, the first actuation element can instead be provided, for example, with a telescopic guide or the like, which allows only the first actuation section 25 to be moved linearly relative to the main rotor body 26.

The linearly movable guidance of the first actuation element 24 takes place in a guide plane which extends parallel to a plane of rotation of the rotor 18 and, in the embodiment shown, is aligned parallel to the upper side 29 and/or coincides with the same.

In the second actuation position, the first actuation section 25 and thus also the first end 30 are displaced outward in the radial direction, and therefore it is also possible to refer to an extended or deployed (second) actuation position. In contrast, the first actuation section 25 and thus also the first end 30 are displaced inward in the radial direction in the first actuation position—relative to the second actuation position—and therefore it is also possible to refer to a retracted or withdrawn (first) actuation position.

In contrast to the first actuation element 24, the second actuation element 27 is arranged and/or formed on the main rotor body 26 in such a way as to be stationary relative thereto. In the embodiment shown, the second actuation element 27 is manufactured separately from the main rotor body 26 and is then fixedly joined to its upper side 29 in a manner known to a person skilled in the art. In an embodiment that is not shown, the second actuation element 27 is instead formed integrally with the main rotor body 26.

For linearly movable guidance of the first actuation element 24, the rotor 18 has the linear guide L. In the embodiment shown, the linear guide L is formed between the first actuation element 24 and the second actuation element 27 in a manner structurally separate from the main rotor body 26. The linear guide L has a first guide profile 34 formed on the first actuation element 24 and a second guide profile 35 formed on the second actuation element 27. The first guide profile 34 and the second guide profile 35 interact in a sliding manner in the radial direction of the rotor axis R and with positive engagement perpendicularly thereto. The first guide profile 34 is in the form of a T-shaped guide slot. The second guide profile 35 is configured complementarily to this in the form of a T-shaped guide rail.

The linear guide L also has stop sections (not illustrated specifically in the drawing), which ensure that the first actuation element 24 is held captive on the second actuation element 27 in the radial direction. In other words, the stop sections prevent the first actuation element 24 from being pulled off from the second actuation element 27 in the radial direction along the linear guide L.

Moreover, in the embodiment shown, the main rotor body 26 has a cuboidal basic shape. At end faces of the main rotor body 26 which are opposite in the radial direction of the rotor axis R, the rotor 18 in each case has a pressure roller 36, which is mounted on a pressure lever 37 so as to be rotatable about an axis 38 extending parallel to the rotor axis R.

The pressure levers 37 are each mounted on the main rotor body 26 so as to be pivotable relative thereto about a further axis 39, likewise extending parallel to the rotor axis R. In order to avoid the hose segment 22 unintentionally being pushed out between the rotor 18 and the support surface 23, the rotor 18 also has guide pins 40. The guide pins 40 are arranged on the respective pressure lever 37 ahead of the pressure rollers 36 in the direction of rotation of the rotor 18. The guide pins 40 are each arranged on the respective pressure lever 37 in pairs and spaced apart in the axial direction, thus ensuring that the hose segment 22 is guided in the axial direction between the axially spaced guide pins 40 relative to the rotating rotor 18.

Figure 2:
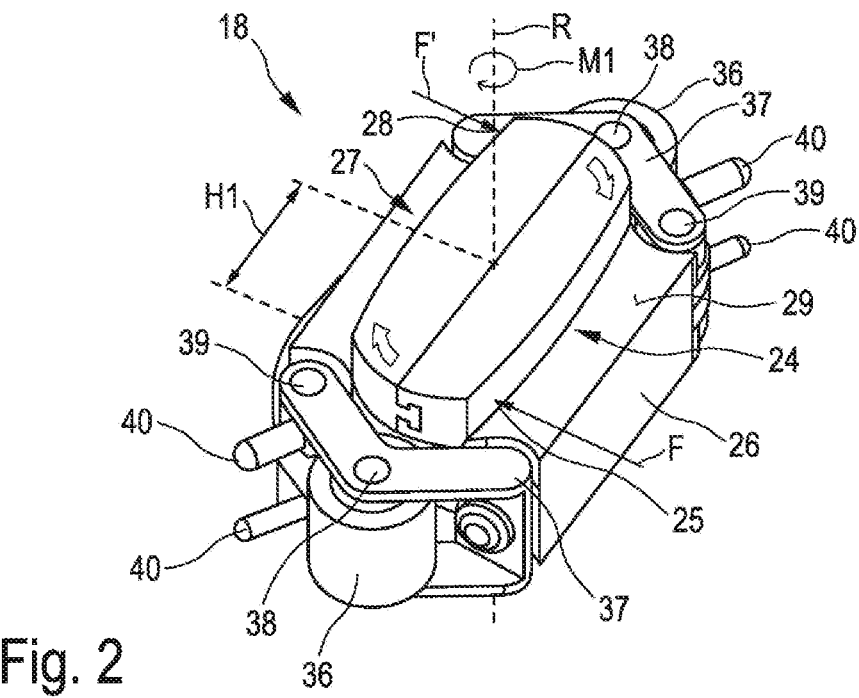
FIG. 2 shows a perspective detail illustration of a rotor of the peristaltic pump, wherein an actuation element is in a first actuation position.
Figure 3:
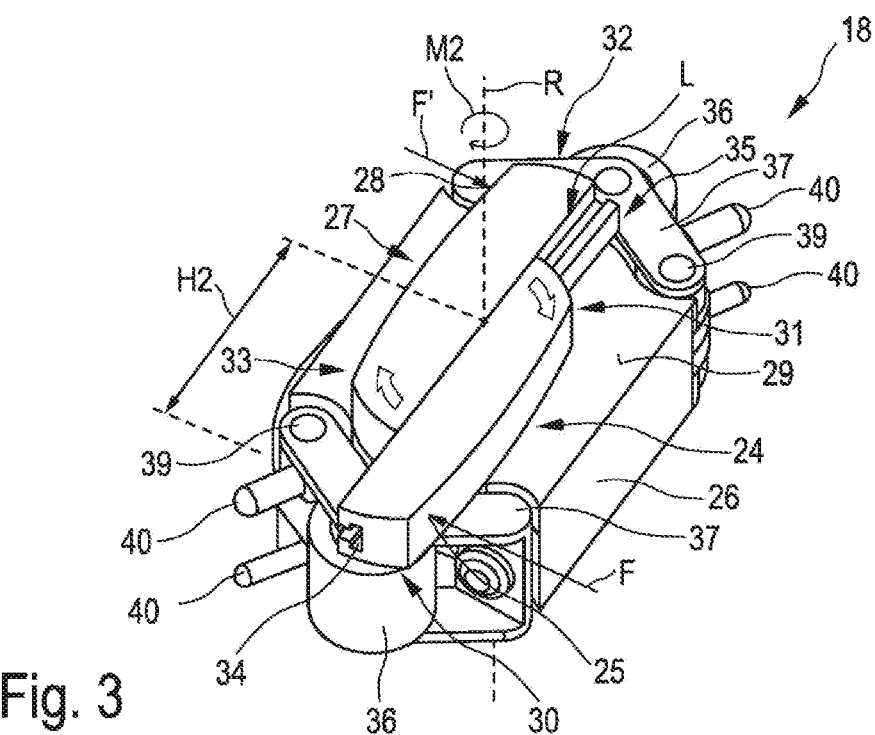
FIG. 3 shows a further schematic perspective illustration of the rotor according to FIG. 2, wherein the actuation element is in a second actuation position.
Figure 4:
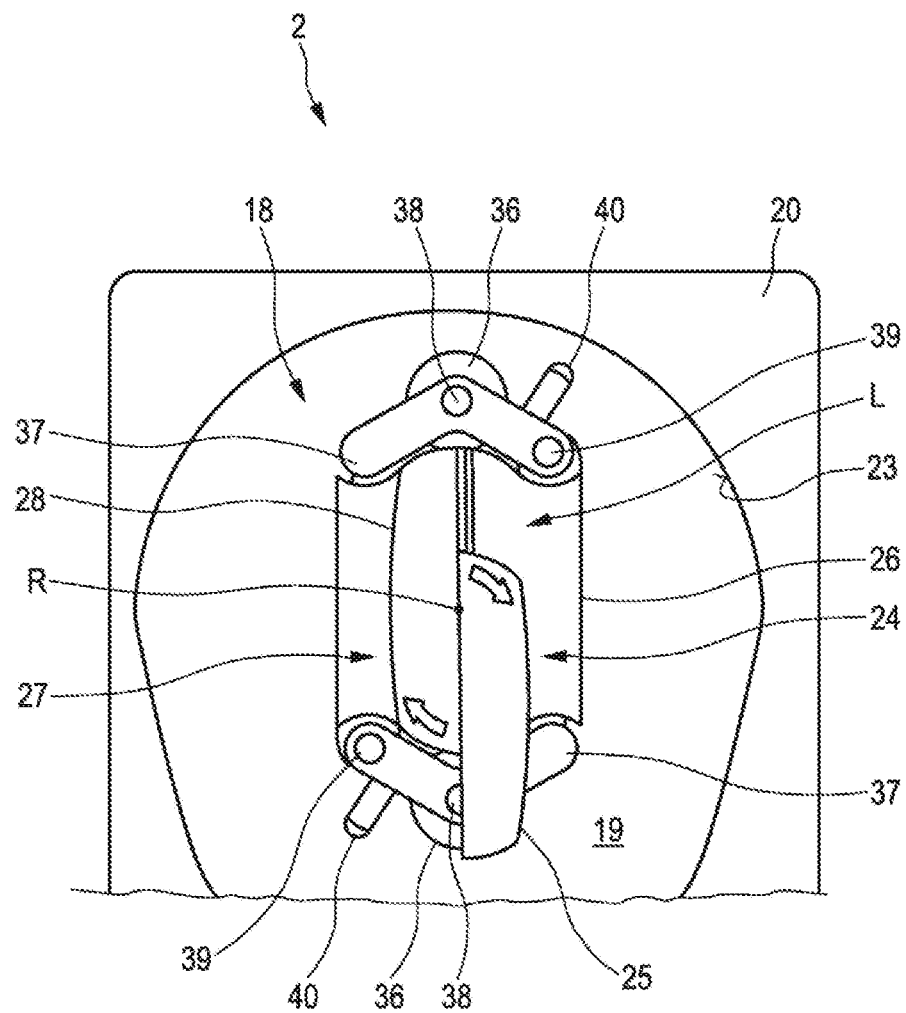
FIG. 4 is a partially cutaway detail illustration of the peristaltic pump according to FIG. 2 in a viewing direction directed along a rotor axis.
Figure 5:
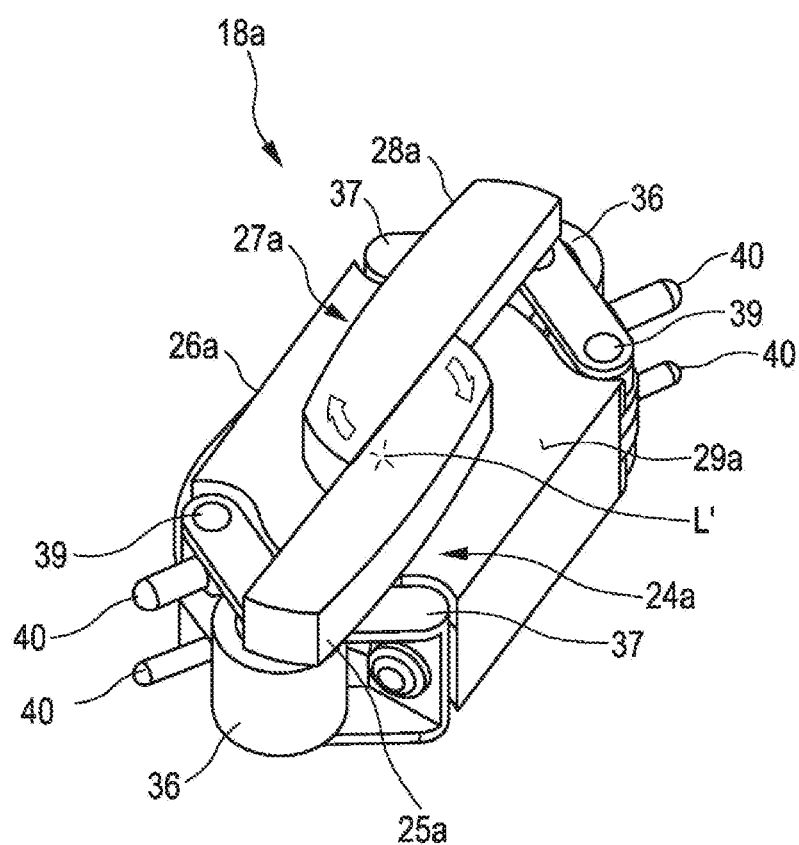
FIG. 5 shows a further embodiment of a rotor according to the invention illustrated in a manner corresponding to FIG. 3.

FIG. 5 shows a further embodiment of a rotor 18a according to the invention which, with regard to its structural and functional design, corresponds substantially to the embodiment according to FIGS. 2 and 3. In order to avoid repetitions, only essential differences between the rotor 18a according to FIG. 5 and the rotor 18 according to FIGS. 2 and 3 will be discussed below, with identical components and/or sections being provided with identical reference signs. Components and/or sections of different configuration are identified by adding the lowercase letter a to the reference numeral. Identical components and/or sections are not explained separately. Instead, attention is drawn to the relevant disclosure in connection with the rotor 18, which also applies analogously with respect to the rotor 18a.

In contrast to the embodiment according to FIGS. 2 and 3, in the case of the rotor 18a both the first actuation element 24a and the second actuation element 27a can be moved in a linearly movable manner between different actuation positions relative to the main rotor body 26a. FIG. 5 shows a configuration in which both actuation elements 24a, 27a are occupying their respective radially extended or deployed actuation position. For this purpose, both actuation elements 24a, 27a are linearly movably guided on the main rotor body 26a. For this purpose, a linear guide L' (not shown specifically in the drawings), which is formed between the rotor main body 26a and the two actuation elements 24a, 27a, is provided. The linear guide L' has complementary guide profiles, which ensure linear guidance with a sliding motion in the radial direction and, perpendicular thereto, mounting of the two actuation elements 24a, 27a on the main rotor body 26a with positive engagement. The complementary guide profiles are arranged and/or formed, on the one hand, on the upper side 29a of the main rotor body 26a and, on the other hand, on the underside of the two actuation elements 24a, 27a. As an alternative or in addition, the guide profiles can each be designed as a central web.

In the retracted or withdrawn position of the two actuation elements 24a, 27a, a configuration is obtained which is identical with respect to the resulting lever arm lengths and flush arrangement of the actuation elements 24a, 27a to the configuration which can be seen from FIG. 2.

The invention claimed is:

1. A peristaltic pump comprising:
    a rotor that is rotatable about a rotor axis and has a main rotor body; and
    a pump housing having a receiving recess, in which the rotor is received, and a support surface that extends arcuately around the rotor axis, is spaced apart radially from the rotor, and is configured to support a hose segment that is radially introducible between the rotor and the support surface,
    the rotor comprising at least one first actuation element configured for manual rotary actuation of the rotor about the rotor axis, the at least one first actuation element having at least one first actuation section for applying a manual rotary actuation force to rotate the rotor about the rotor axis,
    the at least one first actuation element being mounted at least indirectly on the main rotor body,
    at least some section or sections of the at least one first actuation element being movable relative to the main rotor body between a first actuation position, in which the at least one first actuation section is spaced apart from the rotor axis by a first lever arm length, and a second actuation position, in which the at least one first actuation section is spaced apart from the rotor axis by a second lever arm length, wherein the second lever arm length is greater than the first lever arm length, and
    wherein the at least one first actuation element is guided in a linearly movable manner between the first actuation position and the second actuation position.

2. The peristaltic pump according to claim 1, wherein the at least one first actuation element is arranged on an upper side of the main rotor body and is movable between the first actuation position and the second actuation position in a guidance plane extending parallel to a plane of rotation of the rotor.

3. The peristaltic pump according to claim 1, wherein the rotor has a second actuation element with a second actuation section, wherein the at least one first actuation section and the second actuation section are arranged radially opposite at a distance from the rotor axis.

4. The peristaltic pump according to claim 3, wherein the at least one first actuation element and the second actuation element are arranged symmetrically with respect to one another.

5. The peristaltic pump according to claim 3, wherein the second actuation element is arranged and/or formed on the main rotor body in such a way as to be stationary relative thereto.

6. The peristaltic pump according to claim 5, further comprising a linear guide having a first guide portion formed on the at least one first actuation element and a second guide portion formed directly on the second actuation element, and
    wherein the at least one first actuation element is guided, by sliding engagement between the first guide portion and the second guide portion, between the first actuation position and the second actuation position by the linear guide.

7. The peristaltic pump according to claim 3, wherein the second actuation element is mounted at least indirectly on the main rotor body and is movable relative to the main rotor body in a radially opposite manner to the at least one first actuation element between different actuation positions.

8. The peristaltic pump according to claim 1, further comprising a plurality of rollers, each of the plurality of rollers being connected to the rotor to be movable towards and away from the rotor axis.

9. The peristaltic pump according to claim 8, wherein the at least one first actuation element is mounted to the main rotor body separately from each of the plurality of rollers and is movable relative to the main rotor body independently from each of the plurality of rollers.

10. The peristaltic pump according to claim 8, further comprising a plurality of pressure levers, wherein:
   each of the plurality of rollers is rotatably connected to a respective one of the plurality of pressure levers to rotate relative to the respective one of the plurality of pressure levers about a respective roller axis;
   each of the plurality of pressure levers is rotatably connected to the rotor to pivot about a respective lever axis, to thereby enable a radial movement of the respective one of the plurality of rollers towards and away from the rotor axis; and
   wherein the at least one first actuation element is mounted to the main rotor body to be movable independently from each of the plurality of rollers and each of the plurality of pressure levers.

11. The peristaltic pump according to claim 8, wherein the at least one first actuation element protrudes from an upper side of the main rotor body and is spaced along the rotor axis from the plurality of rollers.

12. The peristaltic pump according to claim 11, wherein the at least one first actuation element is positioned to overlap one of the plurality of rollers, as viewed along the rotor axis, when the at least one first actuation element is in the second actuation position.

13. A rotor for a peristaltic pump, the rotor comprising:
   a main rotor body; and
   at least one first actuation element configured for manual rotary actuation of the rotor about a rotor axis,
   the at least one first actuation element comprising at least one first actuation section for applying a manual rotary actuation force to rotate the rotor about the rotor axis,
   the at least one first actuation element being mounted at least indirectly on the main rotor body,
   at least some section or sections of the at least one first actuation element being movable relative to the main rotor body between a first actuation position, in which the at least one first actuation section is spaced apart from the rotor axis by a first lever arm length, and a second actuation position, in which the at least one first actuation section is spaced apart from the rotor axis by a second lever arm length, and
   wherein the at least one first actuation element is guided in a linearly movable manner between the first actuation position and the second actuation position.

14. A device for extracorporeal blood treatment comprising:
   a housing;
   a peristaltic pump mounted to the housing, the peristaltic pump comprising:
      a rotor that is rotatable about a rotor axis and has a main rotor body; and
      a pump housing having a receiving recess, in which the rotor is received, and a support surface that extends arcuately around the rotor axis, is spaced apart radially from the rotor, and is configured to support a hose segment that is radially introducible between the rotor and the support surface,
      the rotor comprising at least one first actuation element configured for manual rotary actuation of the rotor about the rotor axis, the at least one first actuation element having at least one first actuation section for applying a manual rotary actuation force to rotate the rotor about the rotor axis,
      the at least one first actuation element being mounted at least indirectly on the main rotor body,
      at least some section or sections of the at least one first actuation element being movable relative to the main rotor body between a first actuation position, in which the at least one first actuation section is spaced apart from the rotor axis by a first lever arm length, and a second actuation position, in which the at least one first actuation section is spaced apart from the rotor axis by a second lever arm length, wherein the second lever arm length is greater than the first lever arm length, and
      wherein the at least one first actuation element is guided in a linearly movable manner between the first actuation position and the second actuation position;
   an arterial blood line connected to the hose segment upstream of the peristaltic pump and configured to be connected to receive a supply of blood from a patient;
   a venous blood line connected to the hose segment downstream of the peristaltic pump and configured to be connected to deliver the supply of blood to the patient; and
   a dialyzer configured to treat the supply of blood in the venous blood line.

* * * * *